(12) United States Patent
Tanabe et al.

(10) Patent No.: US 7,574,618 B2
(45) Date of Patent: Aug. 11, 2009

(54) INTERFACE CIRCUIT

(75) Inventors: Hirohisa Tanabe, Tokyo (JP); George Fukutomi, Tokyo (JP); Shinji Hiratsuka, Tokyo (JP); Hirofumi Odaguchi, Osaka (JP)

(73) Assignee: Oki Semiconducotr Co., Ltd., Tokyo (JP)

( * ) Notice: Subject to any disclaimer, the term of this patent is extended or adjusted under 35 U.S.C. 154(b) by 374 days.

(21) Appl. No.: 10/663,977

(22) Filed: Sep. 17, 2003
(Under 37 CFR 1.47)

(65) Prior Publication Data
US 2004/0133820 A1    Jul. 8, 2004

(30) Foreign Application Priority Data
Sep. 20, 2002   (JP)   .............................. 2002-275787

(51) Int. Cl.
*G06F 1/32*    (2006.01)
(52) U.S. Cl. .................. 713/322; 713/320; 713/600; 713/601
(58) Field of Classification Search .............. 713/1–601
See application file for complete search history.

(56) References Cited

U.S. PATENT DOCUMENTS

| | | | | |
|---|---|---|---|---|
| 5,151,613 A | * | 9/1992 | Satou et al. | 327/99 |
| 5,621,361 A | * | 4/1997 | Adduci | 331/75 |
| 6,275,087 B1 | * | 8/2001 | Dehghan | 327/306 |
| 6,434,704 B1 | * | 8/2002 | Dean et al. | 713/320 |
| 6,467,042 B1 | * | 10/2002 | Wright et al. | 713/320 |
| 6,473,477 B2 | * | 10/2002 | Watanabe | 375/368 |
| 6,845,454 B2 | * | 1/2005 | Kim | 713/300 |

FOREIGN PATENT DOCUMENTS

| JP | 2001-211276 | 8/2001 |
|---|---|---|
| JP | 2002-152439 | 5/2002 |

OTHER PUBLICATIONS

"Introduction to USB On-The-Go".

* cited by examiner

*Primary Examiner*—Thomas Lee
*Assistant Examiner*—Paul B Yanchus, III
(74) *Attorney, Agent, or Firm*—Studebaker & Brackett PC; Donald R. Studebaker (57) ABSTRACT

Noise removal and detection are performed for a signal VBUS in a detection portion in accordance with a low-frequency clock signal CLK generated by a CR oscillation circuit, and a detection signal VBD is received by a process control portion. A signal VBC detected by the detection portion is supplied to a quartz oscillation circuit as an operation-enable signal ENB. Thus, when a data transmission is designated by the signal VBUS, the quartz oscillation circuit supplies a high-frequency clock signal CK to a transmission function portion, enabling a data transmission. The operation-enable signal ENB is not supplied to the quartz oscillation circuit when data transmission is not performed. The power consumption of the CR oscillation circuit is small, so power consumption can be reduced.

6 Claims, 9 Drawing Sheets

NOISE REMOVAL CIRCUIT 20

FIG. 2B

CHANGE DETECTION CIRCUIT 30

FIG. 2C

CHANGE DETECTION CIRCUIT 40

FIG. 2D

CR OSCILLATION CIRCUIT 50

INTERFACE CIRCUIT

BACKGROUND OF THE INVENTION

1. Field of the Invention

The present invention relates to a USB (Universal Serial Bus) interface circuit which has an OTG (On-The-Go) capability, and particularly to technologies for reducing the power consumption of the circuit.

2. Description of the Related Art

The USB OTG capability allows peripheral devices to perform serial data transmissions on a one-to-one basis with each other without the need of a host computer that was required in conventional USB specifications.

Two peripheral devices which have the USB OTG capability are connected via a cable with four signal lines: D+, D−, VBUS, and GND for mutually transmitting data to each other. The plugs at the ends of the cable are further provided with an ID terminal, with the ID terminal in one plug connected to the GND signal, and the ID terminal in the other plug unconnected. Each peripheral device operates so that, if the ID terminal of the inserted plug is connected to the GND signal, that peripheral device operates as the master, and if the ID terminal is unconnected, the device operates as the slave.

With the USB OTG capability, the signal VBUS is utilized to enable lower power consumption of the peripheral devices. More particularly, the peripheral device established as the master drives the signal VBUS at a "H" level during the period in which a data transmission is performed between the peripheral devices using the D+ and D− signals, and changes the signal VBUS to an "L" level when transmission is not required. Consequently, because there is no requirement to execute a transmission when the signal VBUS is "L", a large proportion of the logic circuits concerned with transmission functions can be stopped, thus enabling a transition to a low power consumption mode.

However, even in the low power consumption mode, it is necessary to have a detection circuit running that detects changes in the signal ID and the signal VBUS, and to restart transmission functions and logic circuits such as those for master/slave switchover when a change in these signals is detected.

A USB interface circuit that has a conventional OTG capability is configured so that a clock signal generated by a master oscillator is frequency-divided by a divider circuit to generate a low-frequency clock, and change in the signal ID and signal VBUS is periodically detected based on the low-frequency clock. And when a change in the signal is detected, the master oscillator clock signal is supplied to the logic circuits so that they come out of the low power consumption mode. It should be noted that, although not regarding USB interface circuits, systems that use the same configuration for switching between a low power consumption mode and a normal operation mode are disclosed in, for example, Japanese Patent Application Kokai No.2001-211276 and No.2002-152439.

However, USB interface circuits with conventional OTG capability have the following problems.

It is necessary to have a master oscillator and a frequency divider constantly running in order to detect a signal change. According to USB specifications, the clock signal of a master oscillator is defined to be a frequency of 48 MHz with a precision of 500 ppm. Therefore, the power consumption of the master oscillator itself is large and the power consumption of the frequency divider that divides the clock signal is also large, thus posing a limitation to efforts at reducing power consumption.

SUMMARY OF THE INVENTION

In order to solve the above-described problems, the present invention according to claims 1 to 3 of the present invention includes an interface circuit provided for each of a first device set as a master side and a second device set as a slave side, for performing a serial data transmission between the first and second devices on the basis of a control signal which is output from the master side, which comprises a first oscillation circuit which generates a first clock signal for data transmission upon receiving an operation-enable signal; a transmission function portion which performs a serial data transmission with the other device upon receiving the first clock signal; a second oscillation circuit which generates a second clock signal having a frequency lower than that of the first clock signal; and a detection portion which detects the control signal on the basis of the second clock signal to output the operation-enable signal when a data transmission mode is designated by the control signal.

According to the invention, following operation is performed.

For example, the low-frequency second clock signal that is constantly generated by the second oscillation circuit, which is constructed of a CR oscillation device, is supplied to the detection portion. The detection portion performs detection of the control signal in accordance with the second clock signal, and an operation-enable signal is output from the detection portion to the first oscillation circuit when a data transmission state or mode is designated. The first oscillation circuit generates, with a quartz oscillation device for example, a high-frequency first clock signal for data transmission to be supplied to the transmission function portion. In this way, a data transmission can be performed mutually with the other device.

The invention according to claims 4 to 8 of the present invention includes an interface circuit provided for each of a first device set as a master side and a second device set as a slave side, for performing a serial data transmission between the first and second devices on the basis of a control signal which is output from the master side, which comprises an oscillation circuit which generates a clock signal for data transmission upon receiving an operation-enable signal; a transmission function portion which performs a serial data transmission with the other device upon receiving the clock signal; a detection portion which monitors the control signal to output a detection signal when there is a change in the detection signal; and a process control portion which performs control of the operation-enable signal on the basis of the detection signal.

According to the invention, following operation is performed.

The control signal is monitored by the detection portion. A detection signal is output from the detection portion to the process control portion when a change in the control signal is detected. The process control portion performs control of the operation-enable signal for the oscillation circuit based on the detection signal. In this way, the oscillation circuit operates when a data transmission is designated by the control signal to generate a clock signal for data transmission, which is supplied to the transmission function portion. Furthermore, when a data transmission is not designated, the operation of the oscillation circuit stops, and the operation of the transmission function portion also stops.

DETAILED DESCRIPTION OF THE INVENTION

First Embodiment

Figure 1:
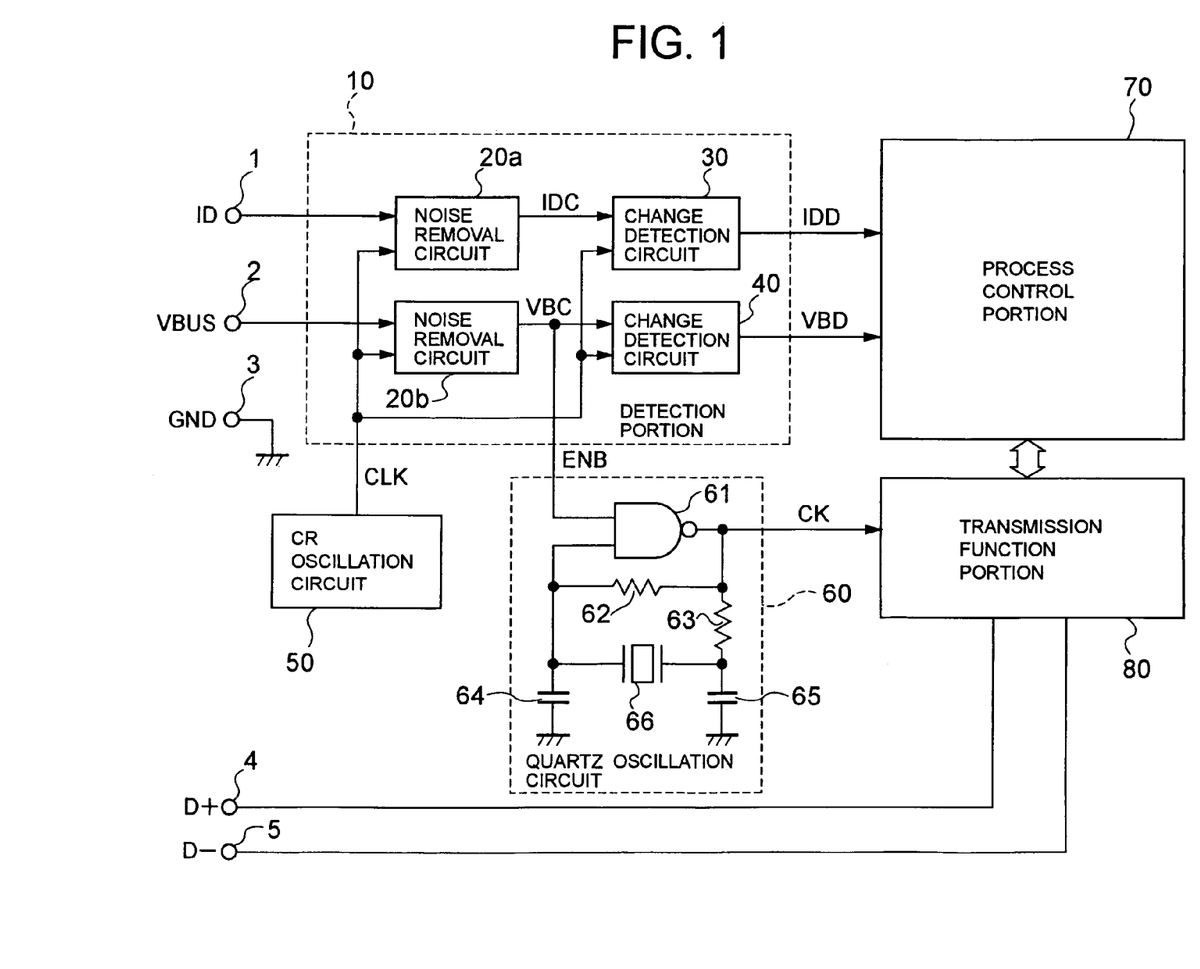
FIG. 1 is a block diagram of a USB interface circuit according to a first embodiment of the present invention.

FIG. 1 is a block diagram of a USB interface circuit according to a first embodiment of the present invention.

The USB interface circuit is OTG compliant and is provided with terminals 1 to 5 for connecting via cable one peripheral device to another. The terminal 1 receives a signal ID that designates master or slave. When the ground potential GND is provided, master is designated, and, when the ground potential GND is not received, slave is designated.

Terminal 2 sends or receives a signal VBUS that designates whether or not there is a data transmission. When there is a data transmission, an "H" signal VBUS is output from the master side, and the slave side receives the signal VBUS and is able to determine whether or not there is a data transmission. It should be noted that the pull-up circuit for the terminal 1 and the signal VBUS output circuit for the terminal 2 are omitted in this diagram.

Terminal 3 transmits a ground potential GND that is common to both the opposing peripheral devices. Terminal 4 and terminal 5 are for the purpose of sending and receiving signals D+ and D− data between the devices.

The terminals 1 and 2 are connected to a detection portion 10. The detection portion 10 includes noise removal circuits 20a and 20b of the same configuration, and two types of change detection circuits 30 and 40. The noise removal circuits 20a and 20b remove noise components from the signals ID and VBUS respectively received from the terminals 1 and 2 to output noiseless signals IDC and VBC.

The change detection circuit 30 detects rises and falls in the signal IDC to output a detection signal IDD. On the other hand, the change detection circuit 40 detects rises in the signal VBC to output a detection signal VBD.

The noise removal circuits 20a and 20b, and the change detection circuits 30 and 40 receive a clock signal CLK of about 100 kHz from a CR oscillation circuit 50 in order to operate. Furthermore, the signal VBC that is output from the noise removal circuit 20b is received as an operation-enable signal ENB for a quartz oscillation circuit 60.

The quartz oscillation circuit 60 is configured with, for example, a two-input negative logical multiplication gate (hereafter, simply referred to as "NAND") 61 that receives the operation-enable signal ENB at a first input terminal, and resistors 62 and 63 and capacitors 64 and 65, which forms a feedback circuit between a second input terminal and the output terminal of the NAND 61, as well as a quartz oscillator 66 that prescribes the oscillation frequency. When the operation-enable signal ENB is received, the quartz oscillation circuit 60 outputs a clock signal CK with a frequency of 48 MHz with a precision of 500 ppm.

Detection signals IDD and VBD that are output from the detection portion 10 are received by a process control portion 70. The process control portion 70 performs control of the all the peripheral devices and also performs control of the switching regarding master/slave on the basis of the detection signals IDD and VBD, and the switching of receiving and sending in data transmissions.

On the other hand, the clock signal CK that is output from the quartz oscillation circuit 60 is supplied to a transmission function portion 80. Based on the clock signal CK, the transmission function portion 80 processes the sending and receiving of the data signals D+ and D− of the terminals 4 and 5, the serial/parallel conversion of the sending/receiving data, and data transfer to and from the process control portion 70.

FIGS. 2A to 2D are circuit diagrams that show examples of the circuits shown in FIG. 1.

Figure 2A:
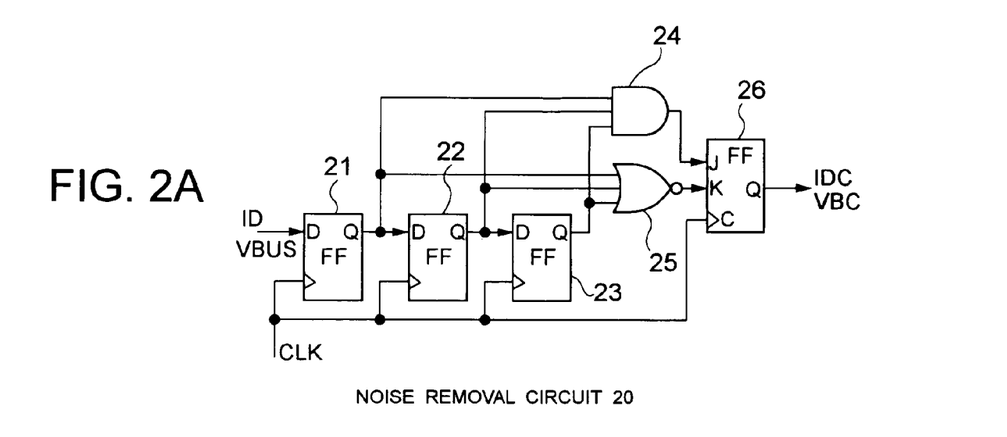
FIGS. 2A-2D show exemplary diagrams of the circuit blocks shown in FIG. 1

As shown in FIG. 2A, the noise removal circuit 20 is provided with three stages of cascade-connected flip-flops (hereafter, simply referred to as "FF") 21 to 23 that successively shift and hold the signals ID and VBUS, in synchronization with the clock signal CLK. The output terminals of the FF 21 to 23 are connected to a 3-input logical multiplication gate (hereafter, simply referred to as "AND") 24, and a 3-input negative logical multiplication gate (hereafter, simply referred to as "NOR") 25. The output terminals of the AND 24 and the NOR 25 are connected respectively to the input terminals J and K of a JK-type FF 26. The signals IDC and VBC are output from the output terminal of the FF 26.

With a noise removal circuit 20 such as this, the signals ID and VBUS are successively shifted and held in the FF 21 to 23, in synchronization with the clock signal CLK. When the signals held in the FF 21 to 23 are consecutively "H", the output signal of the AND 24 becomes "H", setting the FF 26 for output of "H" signals IDC and VBC. Furthermore, if the signals held in the FF 21 to 23 are consecutively "L", the output signal of the NOR 25 becomes "H", resetting the FF 26 to output "L" signals IDC and VBC. In this way, instantaneous noise such as temporary level fluctuations can be removed, and noiseless, stable signals IDC and VBC can be obtained.

Figure 2B:
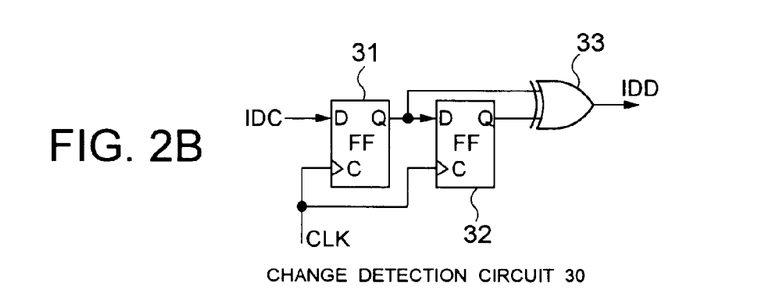

As shown in FIG. 2B, the change detection circuit 30 is comprised of two stages of FFs 31 and 32 that successively shift and hold the signal IDC in synchronization with the clock signal CLK, and a negative logical addition gate (hereafter, simply referred to as "EOR") 33 connected to the output terminals of the FFs 31 and 32. In this way, when the signal IDC changes, that is, when the data held by the FF 31 and 32 are different, an "H" detection signal IDD is output from the EOR 33, and when there is no change in the signal IDC, an "L" detection signal IDD is output.

Figure 2C:
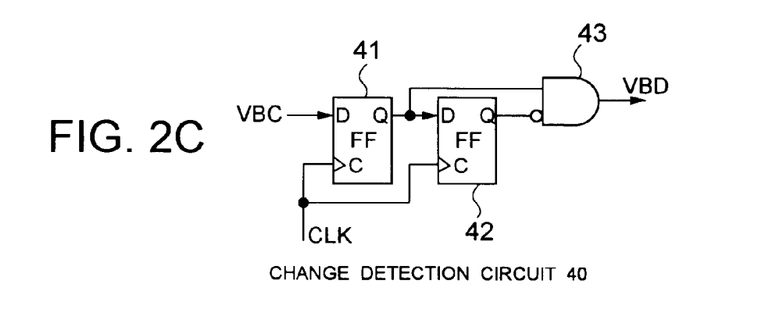

As shown in FIG. 2C, the change detection circuit 40 is comprised of two stages of FFs 41 and 42 that successively shift and hold the signal VBC in synchronization with the clock signal CLK, and a logic gate 43 connected to the output terminals of the FF 41 and 42. The logic gate 43 outputs an "H" signal only when the output signals of the FF 41 and 42 are respectively "H" and "L". In this way, the timing of a rise of the signal VBC is detected and an "H" detection signal VBD is output.

Figure 2D:
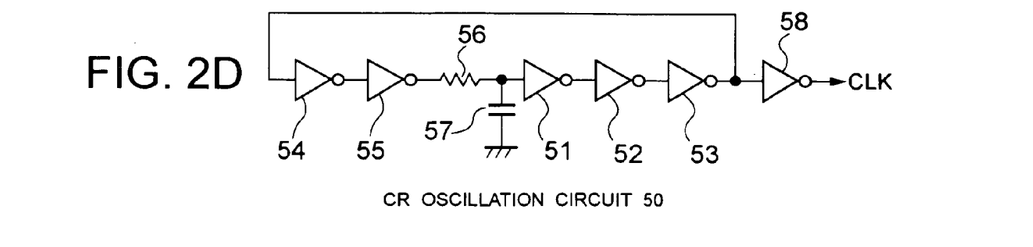

As shown in FIG. 2D, the CR oscillation circuit 50 is provided with an integrated circuit with five cascade-connected inverters 51 to 55, and a resistor 56 and a capacitor 57 connected to the output terminal of the inverter 55 and the input terminal of the inverter 51. Further, an inverter 58 that forms an output buffer is connected to the output terminal of the inverter 53, and the clock signal CLK is output from the output terminal of the inverter 58 with a low speed of about 100 kHz.

The following is a description of the operation of the circuit of the first embodiment.

When the power is turned on and each portion is set to initial state by a reset signal not shown in the drawing, the processes in all the peripheral devices are started by the process control portion 70. Also, the operation of the CR oscillation circuit 50 starts to supply the detection portion 10 with the 100 kHz clock signal CLK.

At the detection portion 10, noise is removed from the signals ID and VBUS received at the terminals 1 and 2 by the noise removal circuits 20a and 20b to generate signals IDC and VBC. The signals IDC and VBC are received respectively by the change detection circuits 30 and 40. Furthermore, the signal VBC is supplied to the quartz oscillation circuit 60 as an operation-enable signal ENB.

The process control portion 70 is set up to perform processing as the master side peripheral device when the signal ID is "L". Further, the process control portion 70 is set up to perform processing as the slave side peripheral device when the signal ID is "H". As long as the cable connection of the peripheral devices is not changed, the signal ID does not change.

On the other hand, the signal VBUS can be switched at any time in response to whether or not there is a data transmission by the peripheral device which is set as the master side.

When the signal VBUS is "H", the signal VBC output from the noise removal circuit 20b is also "H", and the operation of the quartz oscillation circuit 60 starts. The 48 MHz clock signal CK2 output from the quartz oscillation circuit 60 is received by the transmission function portion 80. In this way, the transmission function portion 80 becomes operative, and a data transmission is performed with the other peripheral device via the terminals 4 and 5 with the data signals D+ and D−.

Then, when the signal VBUS changes to "L", the signal VBC output from the noise removal circuit 20B also becomes "L", and the operation-enable signal ENB for the quartz oscillation circuit 60 becomes "L". This stops the clock signal CK of the quartz oscillation circuit 60, and the transmission function portion 80 also stops.

Further, when the signal VBUS changes to "H", the signal VBC output from the noise removal circuit 20B also becomes "H", and the operation-enable signal ENB for the quartz oscillation circuit 60 becomes "H". This restarts the operation of the quartz oscillation circuit 60, and the clock signal CK is supplied to the transmission function portion 80.

Meanwhile, the rise of the signal VBC is detected by the change detection circuit 40, and the process control portion 70 is supplied with the change detection signal VBD. In this way, data transmission with the other peripheral device is restarted by the process control portion 70 and the transmission function portion 80. The above-described operations are repeated in this way in response to changes of the signal VBUS.

As described above, the USB interface circuit of the first embodiment is provided with a CR oscillation circuit 50 that constantly generates the low-speed clock signal CLK required for the operation of the detection portion 10, and a quartz oscillation circuit 60 that generates a high-speed clock signal CK required for data transmission only when an "H" signal VBUS is detected by the detection portion 10. The current consumption of the high-frequency quartz oscillation circuit 60 is about 3 mA for example. In contrast, the current consumption of the low-frequency CR oscillation circuit 50 is about 8 μA for example. Consequently, according to the embodiment, there is the advantage of being able to reduce the power consumption when a data transmission is not being performed.

Furthermore, the noise removal circuit 20b is provided, which removes noise from the signal VBUS to generate a noise-less signal VBC, so that there is the advantage of enabling stable data transmissions that are not affected by noise on the signal VBUS.

Second Embodiment

Figure 3:
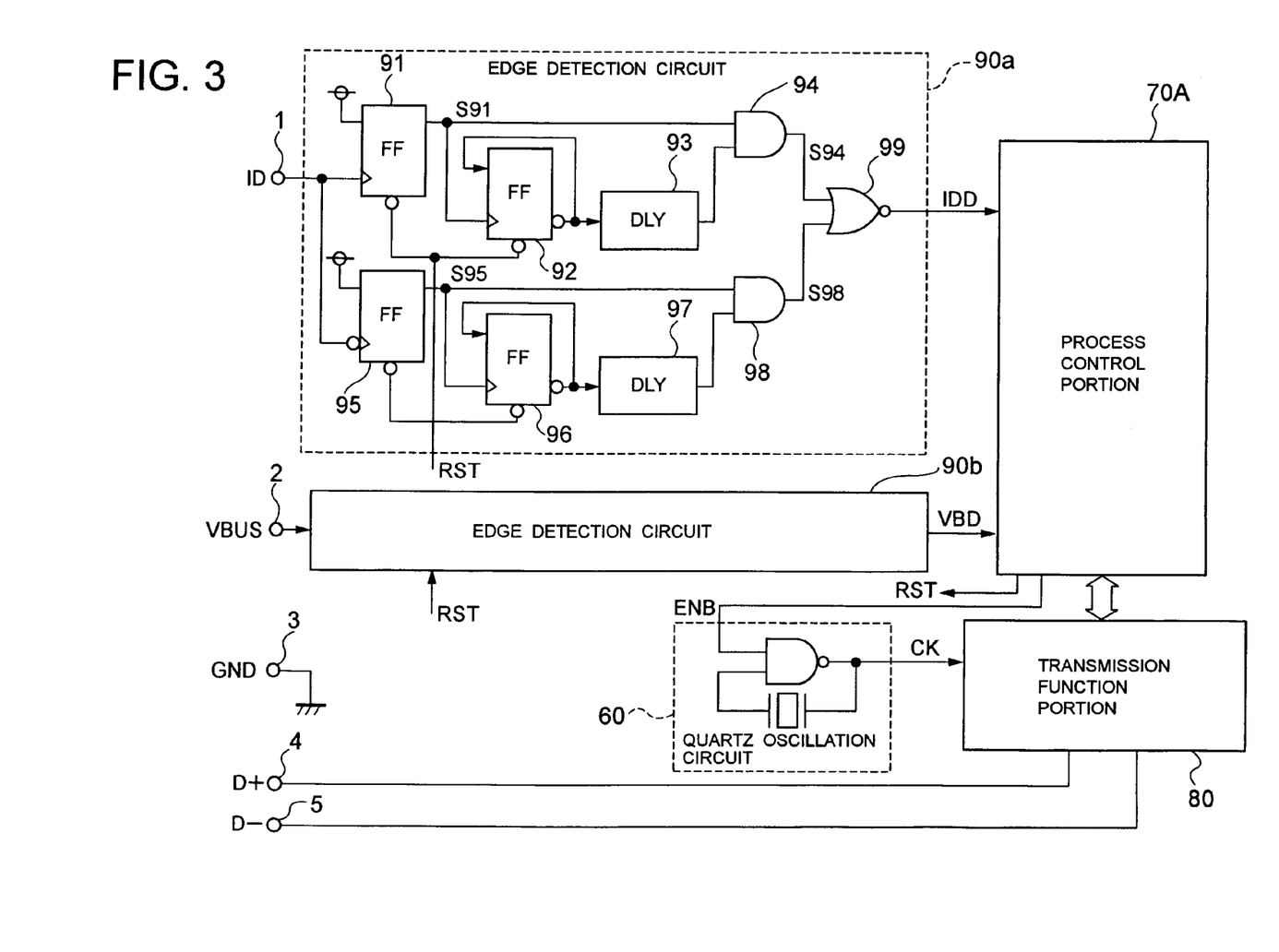
FIG. 3 is a block diagram of a USB interface circuit according to a second embodiment of the present invention.

FIG. 3 is a block diagram of a USB interface circuit according to a second embodiment of the present invention. Common reference numerals are attached to elements that are equivalent to the elements in FIG. 1.

In the USB interface circuit, the CR oscillation circuit 50 in FIG. 1 is eliminated. Additionally, edge detection circuits 90a and 90b are provided instead of the detection portion 10. Further, instead of the process control portion 70, a process control portion 70A which has a function different from the process control portion 70 is provided.

The edge detection circuits 90a and 90b respectively detect changes in the signals ID and VBUS, and the circuits have the same circuit configuration.

For example, the edge detection circuit 90a is provided with an FF 91 which has a data terminal fixed at "H" and a clock terminal to receive a signal ID. The output terminal of the FF 91 is connected to the clock terminal of an FF 92, as well as to one of the input of an AND 94. The inverted output terminal of the FF 92 is linked back to the data terminal of the FF 92 and is connected to the other input terminal of the AND 94 via a delay gate 93.

Further, the signal ID is supplied to the inverted clock terminal of an FF 95, which has a data terminal fixed at "H". The output terminal of the FF 95 is connected to the clock terminal of an FF 96, as well as to one of the input terminals of an AND 98. The inverted output terminal of the FF 96 is linked back to the data terminal of the FF 96 and is connected to the other input terminal of the AND 98 via a delay gate 97.

The output terminals of the AND gates 94 and 98 are connected to the input terminals of a NOR 99. The detection signal IDD is output from the output terminal of the NOR 99, and is supplied to the process control portion 70A. Furthermore, reset terminals of the FF 91, 92, 95, and 96 are supplied with a reset signal RST from the process control portion 70A.

In a similar manner, the edge detection circuit 90b is supplied with the signal VBUS and, in response to changes in the signal VBUS, outputs the detection signal VBD to be supplied to the process control portion 70A.

On the other hand, the process control portion 70A performs control of all the peripheral devices in the same way as the process control portion 70 in FIG. 1, and performs control of the master/slave switchover, and the switchover between data sending and receiving based on the detection signals IDD and VBD. Furthermore, the process control portion 70A has a capability of controlling the operation-enable signal ENB for the quartz oscillation circuit 60 based on the detection signals IDD and VBD received from the edge detection circuits 90a and 90b. The other parts of the configuration are similar to those in FIG. 1.

Figure 4:
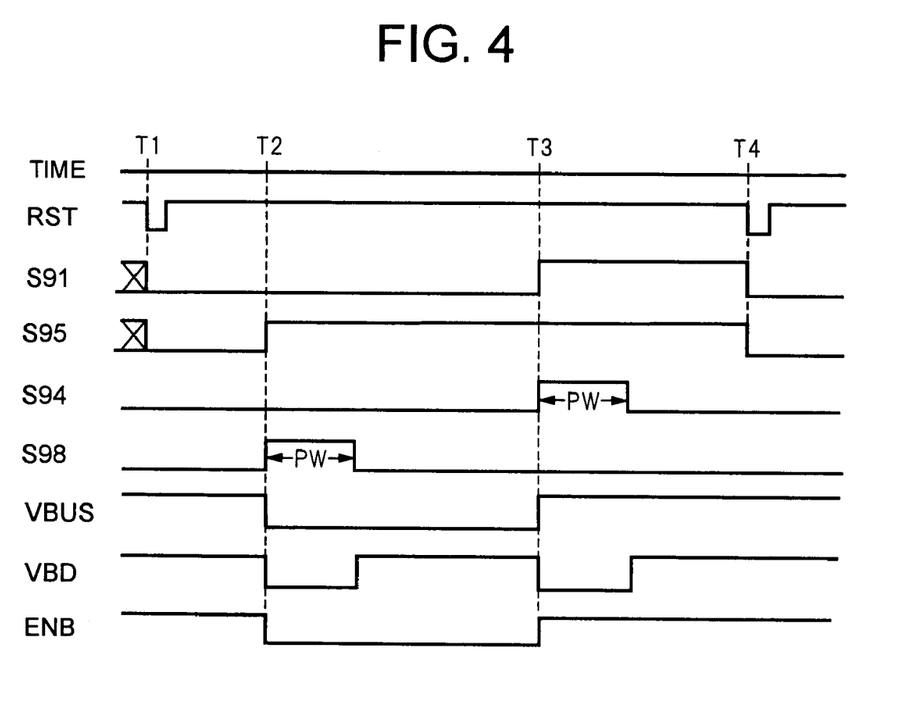
FIG. 4 is a time chart that shows the operation of the circuit shown in FIG. 3.

FIG. 4 is a time chart that shows the operation of the circuit shown in FIG. 3. The following is a description of the operation of the quartz oscillation circuit 60 in FIG. 3 while referring to FIG. 4.

With the turning on of the power, an "H" operation-enable signal ENB is output from the process control portion 70A and the oscillation operation of the quartz oscillation circuit 60 starts.

At the time T1 in FIG. 4, each of the FFs 91, 92, 95, and 96 in the edge detection circuits 90a and 90b is reset when the reset signal RST output from the process control portion 70A becomes "L", and the output signals S91, S95, and so on become "L". The output signals S91, S95 are held even after the reset signal RST is cleared to be "H". Consequently, the detection signal VBD of the edge detection circuit 90b is "H", and an operation-enable signal ENB of "H" is continuously output from the process control portion 70A. In this way, the clock signal CK of the quartz oscillation circuit 60 is supplied to the transmission function portion 80, the transmission function portion 80 becomes operative, and a data transmission is performed with the other peripheral device via the terminals 4 and 5.

At the time T2, the output signal S95 of the FF 95 changes to "H" as the signal VBUS changes to "L". Thus, a signal S98 with a pulse width PW corresponding to the delay time of the delay gate 97 is generated by the pulse circuit constituted by the FF 96, the delay gate 97, and the AND 98. The signal S98 is supplied to the process control circuit 70A as a detection signal VBD via the NOR 99. The process control portion 70A sets the operation-enable signal ENB for the quartz oscillation circuit 60 to "L" based on the detection signal VBD. Thus, the operation of the quartz oscillation circuit 60 is stopped.

At the time T3, the output signal S91 of the FF 91 changes to "H" as the signal VBUS changes to "H". Thus, a signal S94 with the pulse width PW corresponding to the delay time of the delay gate 93 is generated by the pulse circuit constituted by the FF 92, the delay gate 93, and the AND 94. The S94 signal is supplied to the process control circuit 70A as a detection signal VBD via the NOR 99. The process control portion 70A sets the operation-enable signal ENB for the quartz oscillation circuit 60 to "H" based on the detection signal VBD. Thus, the operation of the quartz oscillation circuit 60 is restarted.

At the time T4, the reset signal RST is output from the process control portion 70A and set to the same state as at the time T1. After this, operation is repeated in the above-described manner in response to changes in the signal VBUS of the terminal 2 to control the operation of the quartz oscillation circuit 60.

As described above, the USB interface circuit of the second embodiment is provided with an edge detection circuit 90b which outputs a detection signal VBD with a predetermined pulse width when a change in the signal VBUS is detected. In this way, the CR oscillation circuit which constantly produces the low-frequency clock signal CLK in order to detect changes in the signal VBUS as in the first embodiment becomes unnecessary. Thus, there is the advantage that it is possible to further reduce the power consumption when data transmission is not performed.

Third Embodiment

Figure 5:
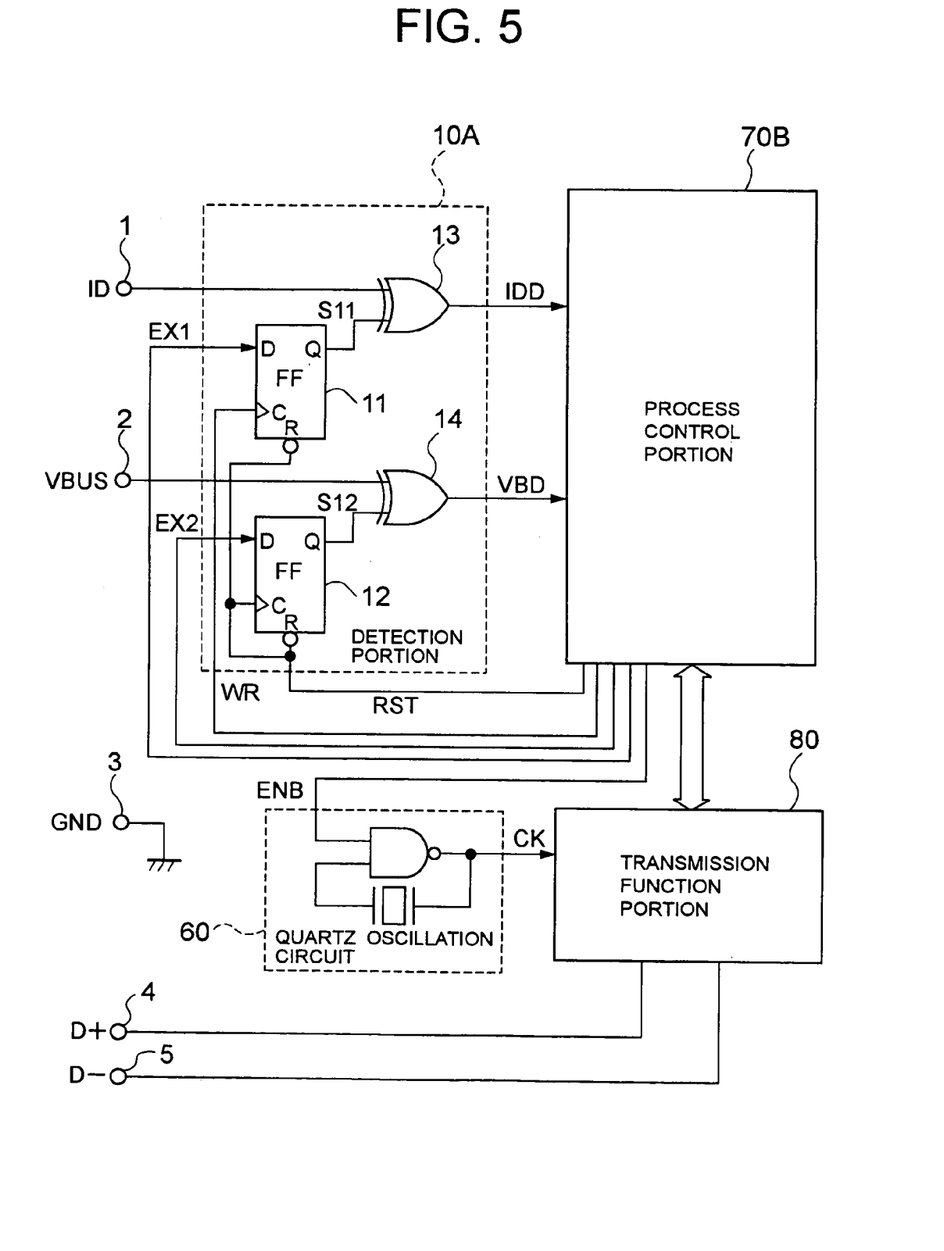
FIG. 5 is a block diagram of a USB interface circuit according to a third embodiment of the present invention.

FIG. 5 is a block diagram of a USB interface circuit according to a third embodiment of the present invention. Common reference numerals are attached to elements that are the same as in FIG. 1.

In the USB interface circuit, the CR oscillation circuit 50 in FIG. 1 is not provided. Moreover, instead of the detection portion 10 and the process control portion 70, a detection portion 10A and a process control portion 70B of different functions are provided.

The detection portion 10A is provided with an FF 11 and 12 which respectively hold expected values EX1 and EX2 supplied from the process control circuit 70B in accordance with a write signal WR received from the process control portion 70B. The output terminal of the FF 11 is connected to an EOR 13 which constitutes a comparator circuit, so that the signal ID that is input at the terminal 1 is compared with the output of the FF 11. Also, the output terminal of the FF 12 is connected to an EOR 14 which constitutes a comparator circuit, so that the signal VBUS that is input at the terminal 2 is compared with the output of the FF 12. The detection signals IDD and VBD that are output from the EOR gates 13 and 14 are supplied to the process control portion 70B.

The process control portion 70B controls all of the peripheral devices in the same manner as the process control portion 70 in FIG. 1, and controls the master/slave switchover, and the switchover between data sending/receiving on the basis of the detection signals IDD and VBD. Furthermore, the process control portion 70B has the function of controlling the operation-enable signal ENB for the quartz oscillation circuit 60 based on the detection signals IDD and VBD that are received from the detection portion 10A. Further, the process control portion 70B has the function of outputting the write signal WR and the expected values EX1 and EX2 in order that the content of the FF 11 and 12 in the detection portion 10A can be rewritten in preparation for the next change detected in the signals ID and VBUS. The other parts of the configuration are the same as in FIG. 1.

Figure 6:
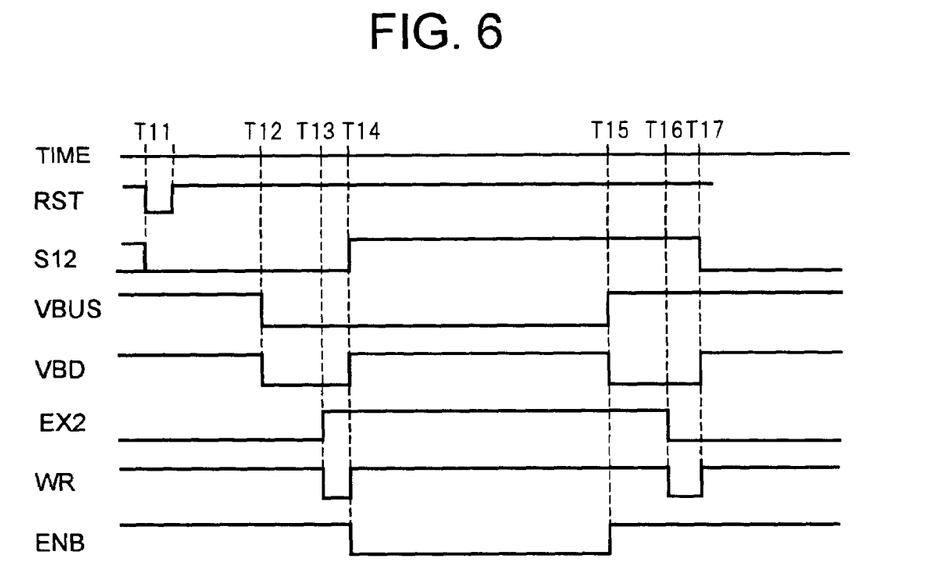
FIG. 6 is a time chart that shows the operation of the circuit shown in FIG. 5.

FIG. 6 is a time chart that shows the operation of the circuit shown in FIG. 5. The following is a description of the operation of the quartz oscillation circuit 60 in FIG. 5 while referring to FIG. 6.

With the turning on of the power, an "H" operation-enable signal ENB is output from the process control portion 70B and the oscillation operation of the quartz oscillation circuit 60 is started.

At the time T11 in FIG. 6, the signals S11 and S12 which are output from the FF 11 and 12 become "L" as the reset signal RST output from the process control portion 70B becomes "L", and are held even after the reset signal RST is cleared to become "H". If the signal VBUS is "H" at this time, the detection signal VBD that is output from the EOR 14 is "H", and an "H" operation-enable signal ENB is continuously output from the process control portion 70B. In this way, the clock signal CK of the quartz oscillation circuit 60 is supplied to the transmission function portion 80, the transmission function portion 80 becomes operative, and a data transmission is performed with the other peripheral device via the terminals 4 and 5.

At the time T12, the detection signal VBD that is output by the EOR 14 becomes "L" when the signal VBUS of the terminal 2 changes to "L". In this way, the process control portion 70B performs processing in response to the stop of a data transmission.

At the time T13, "H" is output from the process control portion 70B as the next expected value EX2, along with an "L" write signal WR.

Then, with the rise of the write signal WR at the time T14, the expected value EX2 is held by the FF 12, and the signal S12 becomes "H". In this way, the detection signal VBD that is output from the EOR 14 returns to "H". Further, an "L" operation-enable signal ENB is output from the process control portion 70B in order to stop the quartz oscillation circuit 60. This stops the clock signal CK of the quartz oscillation circuit 60, and the transmission function portion 80 also becomes stopped.

At the time T15, the detection signal VBD that is output from the EOR 14 becomes "L" as the signal VBUS changes to "H". In this way, the process control portion 70B performs processing in response to the start of a data transmission, and an "H" operation-enable signal ENB is output. This restarts the operation of the quartz oscillation circuit 60 and the clock signal CK is supplied to the transmission function portion 80. Then, the transmission function portion becomes operative, and a data transmission via the terminals 4 and 5 is restarted with the other peripheral device.

At the time T16, "L" is output from the process control portion 70B as the next expected value EX2, along with an "L" write signal WR.

Then, with the rise of the write signal WR at the time T17, the expected value EX2 is held by the FF 12, and the signal S12 becomes "L". Thus, the detection signal VBD that is output from the EOR 14 returns to "H".

After this, operation is repeated in the above-described manner in response to changes in the signal VBUS of the terminal 2, controlling the operation of the quartz oscillation circuit 60.

As described above, the USB interface circuit of the third embodiment is provided with a detection portion 10A that detects changes in the signal VBUS by comparing the signal VBUS with the expected value EX2 written by the process control portion 70B, as well as the process control portion 70B that controls the operation of the quartz oscillation circuit 60 on the basis of the detection signal VBD of the detection portion 10A. Thus, the third embodiment has the same advantages as the second embodiment.

Fourth Embodiment

Figure 7:
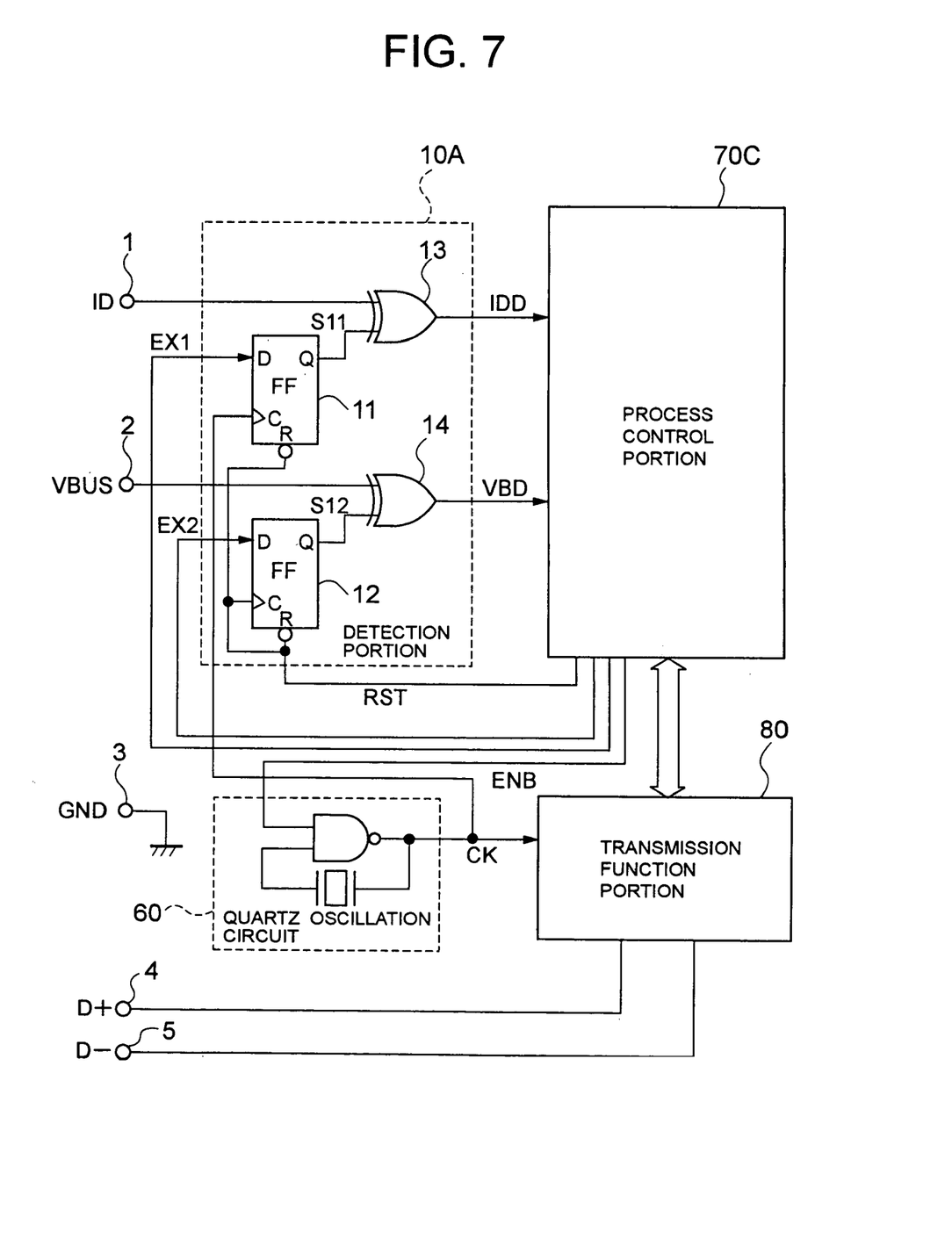
FIG. 7 is a block diagram of a USB interface circuit according to a fourth embodiment of the present invention.

FIG. 7 is a block diagram of a USB interface circuit according to a fourth embodiment of the present invention. Common reference numerals are attached to elements that are similar to the elements shown in FIG. 5.

In the USB interface circuit, instead of the process control portion 70B in FIG. 5, a process control portion 70C is provided which performs a slightly different processing from the process control portion 70B. More specifically, the function of outputting a write signal WR for the detection portion 10A is eliminated in the process control portion 70C. The clock terminals C of the FF 11 and 12 of the detection portion 10A are supplied with the clock signal CK from the quartz oscillation circuit 60. The other parts of the configuration are the same as in FIG. 5.

Figure 8:
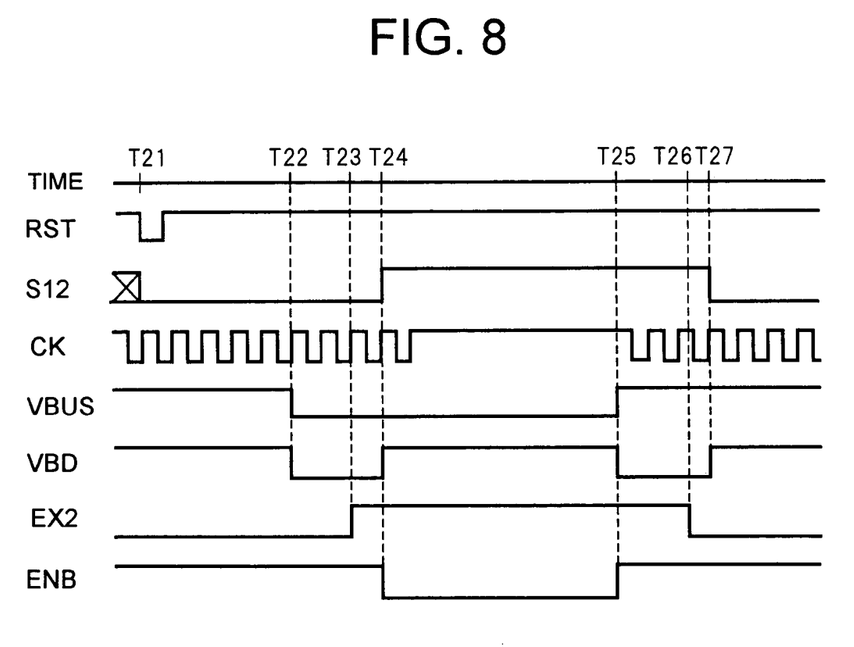
FIG. 8 is a time chart that shows the operation of the circuit shown in FIG. 7.

FIG. 8 is a time chart showing the operation of the circuit shown in FIG. 7. The following is a description of the operation of the quartz oscillation circuit 60 in FIG. 7 while referring to FIG. 8.

With the turning on of the power, an "H" operation-enable signal ENB is output from the process control portion 70C and the oscillation operation of the quartz oscillation circuit 60 starts.

At the time T21 in FIG. 8, the signals S11 and S12 that are output from the FFs 11 and 12 become "L" due to the reset signal RST that is output from the process control portion 70C. If the signal VBUS is "H" at the time, the detection signal VBD that is output from the EOR 14 is "H", and an "H" operation-enable signal ENB is continuously output from the process control portion 70C. Thus, the operation of the quartz oscillation circuit 60 is continued.

At the time T22, the detection signal VBD that is output from the EOR 14 becomes "L" as the signal VBUS of the terminal 2 changes to "L". Thus, the process control portion 70C performs processing according to the stop of a data transmission.

At the time T23, "H" is output from the process control portion 70C as the next expected value EX2. Thus, with the rise of the clock signal CK at the time T24, the expected value EX2 is held in the FF 12, the signal S12 becomes "H", and the detection signal VBD that is output from the EOR 14 returns to "H". Further an "L" operation-enable signal ENB is output from the process control portion 70C in order to stop the quartz oscillation circuit 60. Thus, the operation of the quartz oscillation circuit 60 is stopped.

At the time T25, when the signal VBUS changes to "H", the detection signal VBD that is output from the EOR 14 becomes "L", an "H" operation-enable signal ENB is output from the process control portion 70C, and the operation of the quartz oscillation circuit 60 is restarted.

At the time T26, "L" is output from the process control portion 70C as the next expected value EX2. Thus, with the rise of the clock signal CK at the time T27, the expected value EX2 is held in the FF 12, and the signal S12 becomes "L". Thus, the VBD detection signal that is output from the EOR 14 returns to "H".

After this, operation is repeated in the above-described manner in response to changes in the signal VBUS of the terminal 2, controlling the operation of the quartz oscillation circuit 60.

Thus, the USB interface circuit of the fourth embodiment has the same advantages as the third embodiment.

Fifth Embodiment

Figure 9:
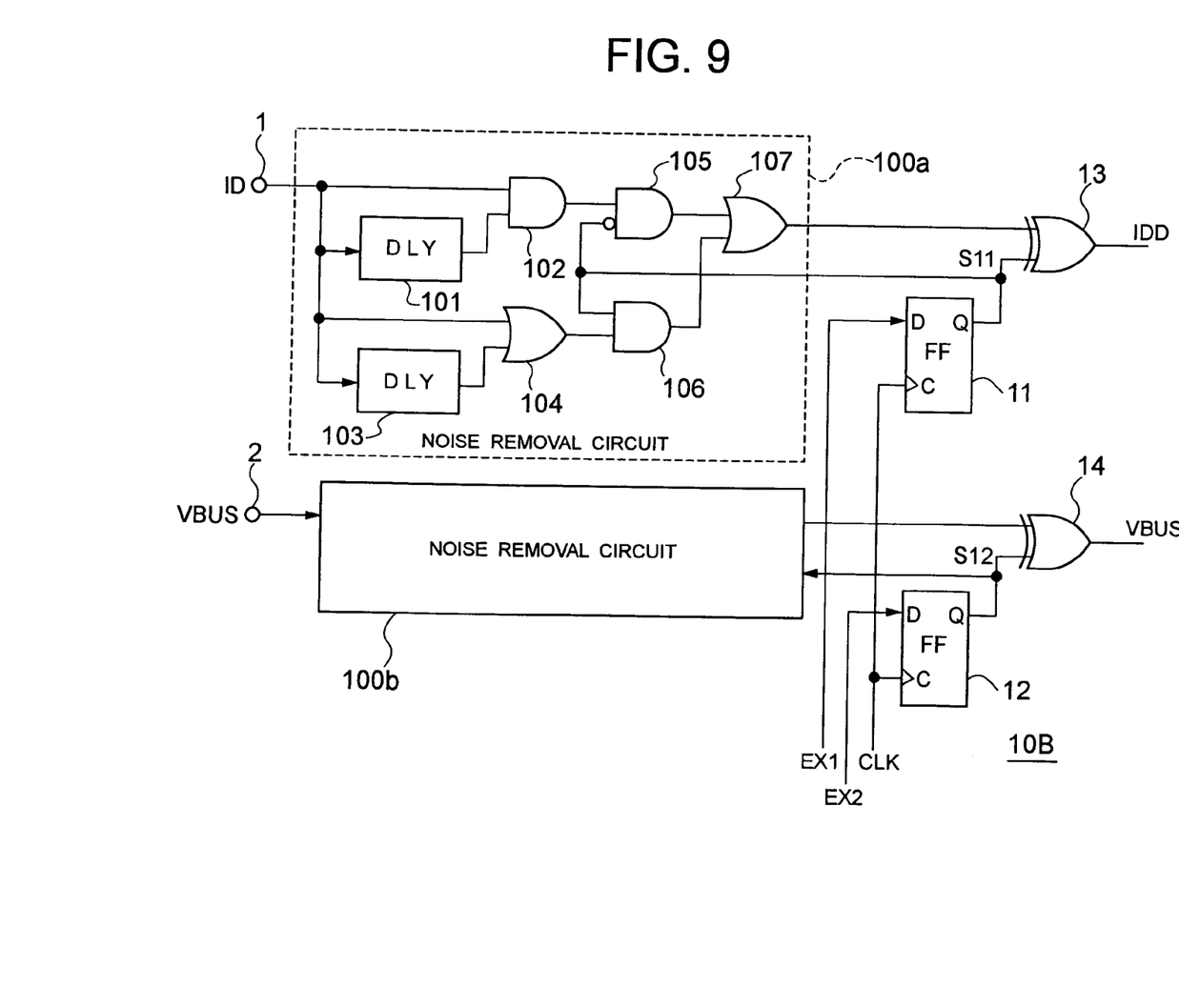
FIG. 9 is a block diagram of a detection portion according to a fifth embodiment of the present invention.

FIG. 9 is a block diagram of a detection portion according to a fifth embodiment of the present invention.

The detection portion 10B is provided with noise removal circuits 100a and 100b in a portion preceding the detection portion 10A instead of the detection portion 10A in FIG. 7. The noise removal circuits 100a and 100b have the same circuit configuration and respectively remove noise from the signals ID and VBUS.

The noise removal circuit 100a is provided with an AND 102 that receives the signal ID and the delayed signal of the signal ID which is delayed by a delay gate 101, as well as a logical addition gate (hereafter, simply referred to as "OR") 104 that receives the signal ID and the delayed signal of the signal ID which is delayed by a delay gate 103.

The output terminal of the AND 102 is connected to a first input terminal of a logic gate 105. The logic gate 105 outputs "H" only when "H" is input to the first input terminal and "L" is input to a second input terminal. The signal S11 that is output from the FF 11 is supplied to the second input terminal as an expected value. Also, the output terminal of the OR 104 is connected to a first input terminal of an AND 106. The signal S11 is supplied to the second input terminal of the AND 106 as an expected value.

The output terminals of the logic gate 105 and the AND 106 are connected to the input terminal of an OR 107. The OR 107 outputs a signal ID from which noise has been removed at the output terminal thereof. The signal ID is supplied to a NOR 13.

When the expected value (S11) is "L", "L" input pulses that are shorter than the delay time of the delay gate 101 are removed by the delay gate 101, the AND 102, and the logic gate 105 in the noise removal circuit 100a. Furthermore, when the expected value is "H", "H" input pulses are detected by the OR 104 and the AND 105 regardless of the pulse width. Thus, a faulty stop of the operation of the quartz oscillation circuit 60 caused by noise can be prevented.

The other configuration and operation are similar to those in the fourth embodiment.

As described above, the detection portion 10B of the fifth embodiment is provided with the noise removal circuits 100a and 100b which remove short-period "L" noise that is superimposed on the signals ID and VBUS. Thus, there is the advantage of being able to prevent a faulty operation caused by noise.

It should be noted that the present invention is not limited to the above-described embodiments, and may be embodied in various other forms. Examples of the other embodiments include the following.

(a) Description has been given with regard to a USB interface circuit that has OTG capability, but the present invention may also be applied to an interface circuit provided with an oscillation circuit which generates a clock signal for transmissions based on a control signal that designates whether or not there is a data transmission.

(b) The configurations of the circuits such as the noise removal circuits, the change detection circuits, the detection portions, the edge detection circuits, and the oscillation circuits are not limited to those given in the above-mentioned embodiments.

As described in the above description, according to the first to third aspects of the present invention, there are provided: a detection portion that detects a control signal by a low-frequency second clock signal generated by a second oscillation circuit, and a first oscillation circuit which generates a first clock signal for data transmission to supply the signal to a transmission function portion, when a data transmission is designated by the control signal. In this way, when there is no transmission, the operations of the first oscillation circuit and the transmission function portion are stopped, thus enabling power consumption to be reduced when there is no transmission.

According to the fourth to eighth aspects of the present invention, there are provided: a detection portion which detects changes in a control signal, and a process control portion that performs control of an operation-enable signal for an oscillation circuit based on changes in the control signal. In this way, when there is no transmission, the operations of the oscillation circuit and the transmission function portion are stopped, thus enabling power consumption to be further reduced when there is no transmission.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No.2002-275787 which is hereby incorporated by reference.

What is claimed is:

1. An interface circuit provided for each of a first device set as a master side and a second device set as a slave side, for performing a serial data transmission between the first and second devices on the basis of a control signal which is output from the master side, comprising:

a detection portion which monitors the control signal to output a detection signal when there is a level change of the control signal;

a process control portion which generates and switches an operation-enable signal and operation disable signal each time the detection signal is supplied thereto;

a gated-clock oscillator which generates a gated clock signal for data transmission only when the operation-enable signal from the process control portion is supplied thereto; and a transmission function which performs the serial data transmission on the basis of the gated clock signal.

2. The interface circuit according to claim 1, wherein the detection portion comprises:

a first flip-flop which is set at either one of the timings of a rise and a fall of the control signal;

a second flip-flop which holds an output signal of the first flip-flop;

a delay gate which delays an output signal of the second flip-flop by a predetermined time period; and a gate circuit which detects the change of the control signal on the basis of the output signal of the delay gate and the output signal of the first flip-flop to detect a change of the control signal.

3. The interface circuit according to claim 1, wherein the detection portion comprises:

a register which holds an expected value supplied from the process control portion in accordance with the state of the control signal; and a comparator circuit which compares the expected value held in the register with the control signal to output the detection signal on the basis of the comparison result;

wherein the process control portion is configured so as to perform control of the operation-enable signal in response to the detection signal, while re-writing the register value of the detection portion with the expected value for the next control signal in response to the detection signal.

4. The interface circuit according to claim 1, wherein the detection portion comprises:

a register which holds an expected value supplied from the process control portion in accordance with the state of the control signal in synchronization with the clock signal; and a comparator circuit which compares the expected value held in the register with the control signal to output the detection signal on the basis of the comparison result;

wherein the process control portion is configured so as to perform control of the operation-enable signal in response to the detection signal, while supplying the expected value for the next control signal to the register of the detection portion in response to the detection signal.

5. The interface circuit according to claim 3, wherein the detection portion comprises:

a noise removal circuit which removes noise components having short pulse widths contained in the control signal.

6. The interface circuit according to claim 4, wherein the detection portion includes a noise removal circuit for removing a noise that is superimposed on the control signal.

* * * * *

UNITED STATES PATENT AND TRADEMARK OFFICE
CERTIFICATE OF CORRECTION

PATENT NO.        : 7,574,618 B2
APPLICATION NO.   : 10/663977
DATED             : August 11, 2009
INVENTOR(S)       : Hirohisa Tanabe et al.

It is certified that error appears in the above-identified patent and that said Letters Patent is hereby corrected as shown below:

Title Page, Item (73) should read:
Assignee: OKI SEMICONDUCTOR CO., LTD., Tokyo (JP)

Signed and Sealed this

Twenty-second Day of December, 2009

David J. Kappos
*Director of the United States Patent and Trademark Office*